（12） United States Patent
Sumner et al.

(10) Patent No.: US 7,680,044 B2
(45) Date of Patent: Mar. 16, 2010

(54) SYSTEMS AND METHODS FOR MANAGING TRAFFIC WITHIN A PEER-TO-PEER NETWORK

(75) Inventors: Devon S. Sumner, Holladay, UT (US);
W. Bryant Eastham, Draper, UT (US)

(73) Assignee: Panasonic Electric Works Co., Ltd., Osaka (JP)

( * ) Notice: Subject to any disclaimer, the term of this patent is extended or adjusted under 35 U.S.C. 154(b) by 841 days.

(21) Appl. No.: 11/324,030

(22) Filed: Dec. 29, 2005

(65) Prior Publication Data
US 2007/0159966 A1    Jul. 12, 2007

(51) Int. Cl.
*H04L 12/26* (2006.01)
(52) U.S. Cl. .................................. 370/231; 370/232
(58) Field of Classification Search ............... 370/229, 370/230, 230.1, 236, 236.1, 231, 232, 236.2; 709/227
See application file for complete search history.

(56) References Cited

U.S. PATENT DOCUMENTS

| | | | | |
|---|---|---|---|---|
| 5,892,754 | A * | 4/1999 | Kompella et al. | 370/236 |
| 6,236,641 | B1 * | 5/2001 | O'Connell et al. | 370/230 |
| 6,330,238 | B1 * | 12/2001 | Ooe | 370/390 |
| 6,449,491 | B1 * | 9/2002 | Dailey | 455/518 |
| 2002/0126670 | A1 * | 9/2002 | Yamauchi et al. | 370/390 |
| 2003/0072271 | A1 * | 4/2003 | Simmons et al. | 370/255 |
| 2003/0189495 | A1 * | 10/2003 | Pettler et al. | 340/854.3 |
| 2003/0212804 | A1 * | 11/2003 | Hashemi | 709/228 |
| 2004/0120256 | A1 | 6/2004 | Park | |
| 2004/0221043 | A1 * | 11/2004 | Su et al. | 709/227 |
| 2005/0204042 | A1 | 9/2005 | Banerjee et al. | |
| 2005/0213525 | A1 | 9/2005 | Grayson et al. | |
| 2005/0232293 | A1 | 10/2005 | Pelt et al. | |
| 2006/0168318 | A1 * | 7/2006 | Twiss | 709/238 |

OTHER PUBLICATIONS

"A Network-Supported Approach to Layered Multicast", Nakauchi et al., School of Engineering, The University of Tokyo, pp. 1227-1231.

* cited by examiner

*Primary Examiner*—Kwang B Yao
*Assistant Examiner*—Andrew Lai
(74) *Attorney, Agent, or Firm*—Austin Rapp & Hardman

(57) ABSTRACT

In a peer-to-peer network, one or more congestion events are defined that imply congestion on the network. In addition, one or more non-congestion events are defined that imply a lack of congestion on the network. When a node detects the occurrence of one or more of the defined congestion events, the node increases the spacing of connectionless protocol (e.g., UDP) packets that are sent by the node. When a node detects the occurrence of one or more of the defined non-congestion events, the node decreases the spacing of connectionless protocol packets that are sent by the node.

19 Claims, 12 Drawing Sheets

SYSTEMS AND METHODS FOR MANAGING TRAFFIC WITHIN A PEER-TO-PEER NETWORK

TECHNICAL FIELD

The present invention relates generally to computers and computer-related technology. More specifically, the present invention relates to systems and methods for managing traffic within a peer-to-peer network.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

Computers typically have one or more processors at the heart of the computer. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded devices or embedded systems. (The terms "embedded device" and "embedded system" will be used interchangeably herein.) An embedded system usually refers to computer hardware and software that is part of a larger system. Embedded systems may not have typical input and output devices such as a keyboard, mouse, and/or monitor. Usually, at the heart of each embedded system is one or more processor(s).

A lighting system may incorporate an embedded system. The embedded system may be used to monitor and control the effects of the lighting system. For example, the embedded system may provide controls to dim the brightness of the lights within the lighting system. Alternatively, the embedded system may provide controls to increase the brightness of the lights. The embedded system may provide controls to initiate a specific lighting pattern among the individual lights within the lighting system. Embedded systems may be coupled to individual switches within the lighting system. These embedded systems may instruct the switches to power up or power down individual lights or the entire lighting system. Similarly, embedded systems may be coupled to individual lights within the lighting system. The brightness or power state of each individual light may be controlled by the embedded system.

A security system may also incorporate an embedded system. The embedded system may be used to control the individual security sensors that comprise the security system. For example, the embedded system may provide controls to power up each of the security sensors automatically. Embedded systems may be coupled to each of the individual security sensors. For example, an embedded system may be coupled to a motion sensor. The embedded system may power up the individual motion sensor automatically and provide controls to activate the motion sensor if motion is detected. Activating a motion sensor may include providing instructions to power up an LED located within the motion sensor, output an alarm from the output ports of the motion sensor, and the like. Embedded systems may also be coupled to sensors monitoring a door. The embedded system may provide instructions to the sensor monitoring the door to activate when the door is opened or closed. Similarly, embedded systems may be coupled to sensors monitoring a window. The embedded system may provide instructions to activate the sensor monitoring the window if the window is opened or closed.

Some embedded systems may also be used to control wireless products such as cell phones. The embedded system may provide instructions to power up the LED display of the cell phone. The embedded system may also activate the audio speakers within the cell phone to provide the user with an audio notification relating to the cell phone.

Home appliances may also incorporate an embedded system. Home appliances may include appliances typically used in a conventional kitchen, e.g., stove, refrigerator, microwave, etc. Home appliances may also include appliances that relate to the health and well-being of the user. For example, a massage recliner may incorporate an embedded system. The embedded system may provide instructions to automatically recline the back portion of the chair according to the preferences of the user. The embedded system may also provide instructions to initiate the oscillating components within the chair that cause vibrations within the recliner according to the preferences of the user.

Additional products typically found in homes may also incorporate embedded systems. For example, an embedded system may be used within a toilet to control the level of water used to refill the container tank. Embedded systems may be used within a jetted bathtub to control the outflow of air.

As stated, embedded systems may be used to monitor or control many different systems, resources, products, etc. With the growth of the Internet and the World Wide Web, embedded systems are increasingly connected to the Internet so that they can be remotely monitored and/or controlled. Other embedded systems may be connected to computer networks including local area networks, wide area networks, etc. As used herein, the term "computer network" (or simply "network") refers to any system in which a series of nodes are interconnected by a communications path. The term "node" refers to any device that may be connected as part of a computer network. An embedded system may be a network node. Other examples of network nodes include computers, personal digital assistants (PDAs), cell phones, etc.

Some embedded systems may provide data and/or services to other computing devices using a computer network. Many different kinds of services may be provided. Some examples of services include providing temperature data from a location, providing surveillance data, providing weather information, providing an audio stream, providing a video stream, etc.

A number of nodes (including at least some embedded systems) may be interconnected so as to form a peer-to-peer network. A peer-to-peer computer network is a network in which each node may communicate with any other node without connecting to a separate server computer or server software. A peer-to-peer network relies on the computing power and bandwidth of the participants in the network rather than concentrating it in a relatively few number of servers. Peer-to-peer networks may be used for connecting nodes via largely ad hoc connections.

A number of nodes within a peer-to-peer network may be communicating with one another at roughly the same time, and as a result the network may become congested. If this occurs, then nodes may not be able to utilize the network as other nodes are currently sending packets. The lack of a central server node in peer-to-peer networking makes this problem more acute. Known attempts to minimize packet loss unduly affect throughput, i.e., the amount of data that is transmitted through the network. Accordingly, benefits may be realized by improvements related to managing traffic within a peer-to-peer network in order to maximize throughput while minimizing packet loss.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
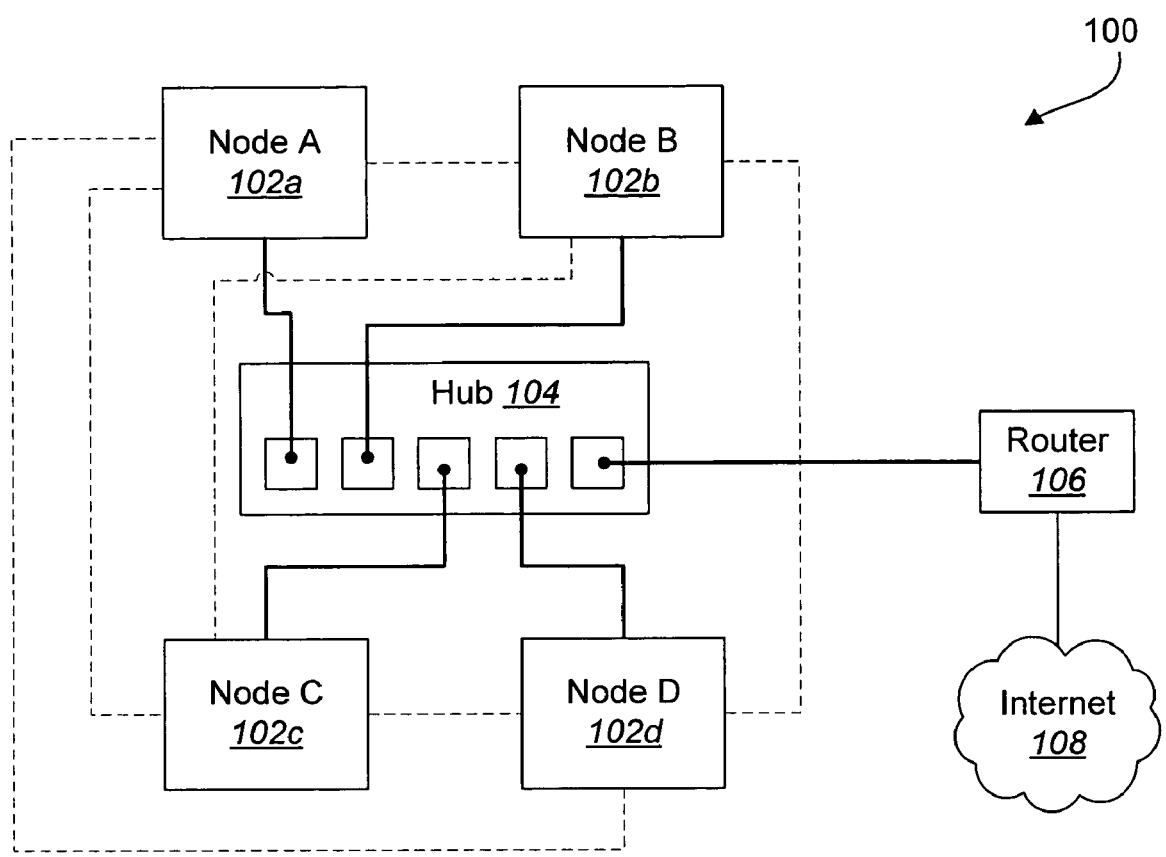
FIG. 1 illustrates an exemplary peer-to-peer network in which some embodiments may be practiced.

Systems and methods for managing traffic within a peer-to-peer network are disclosed. In an exemplary embodiment, one or more congestion events are defined that imply congestion on a peer-to-peer network. In addition, one or more non-congestion events are defined that imply a lack of congestion on the peer-to-peer network but that may help forecast/predict future network congestion. When a node detects the occurrence of one or more of the defined congestion events, the node increases the spacing of connectionless protocol (e.g., User Datagram Protocol) packets that are sent by the node. When a node detects the occurrence of one or more of the defined non-congestion events, the node decreases the spacing of connectionless protocol packets that are sent by the node. Some of the nodes within the peer-to-peer network may be embedded systems.

Many different kinds of non-congestion events and congestion events may be defined. An exemplary non-congestion event is that a node receives a multicast request and a responder list that is associated with the multicast request, and the node is included in the responder list. Conversely, an exemplary congestion event is that a node receives a multicast request and a responder list that is associated with the multicast request, and the node is not included in the responder list when it should be.

Another exemplary congestion event is that a node sends a multicast request. Another exemplary congestion event is that a node receives a multicast request but does not receive a responder list that is associated with the multicast request, and the node sends multiple responses to the multicast request. Another exemplary congestion event is that a node receives a multicast request while waiting to send a packet. Another exemplary congestion event is that a node receives a unicast response while waiting to send a packet.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 illustrates an exemplary peer-to-peer network 100 in which some embodiments may be practiced. The network 100 includes a number of nodes 102. In particular, the network 100 includes node A 102a, node B 102b, node C 102c, and node D 102d. The network 100 also includes a hub 104 that connects the nodes 102 to one another, and a router 106 that enables the nodes 102 to communicate with other devices outside the network 100 via the Internet 108. Of course the Internet 108 is only one type of network that could be accessed through the router 106.

The solid lines shown in FIG. 1 represent physical connections between nodes 102. Thus, each node 102 is physically connected to the hub 104. The router 106 is also physically connected to the hub 104, and to the Internet 108. The dotted lines shown in FIG. 1 indicate that each node 102 on the network 100 is able to communicate with all of the other nodes 102 on the network 100. Also, one or more devices on the Internet 108 may communicate with the nodes 102 in the network 100, and vice versa.

Embodiments disclosed herein may be practiced in a peer-to-peer network 100 where at least some of the nodes 102 are embedded systems. As discussed above, the term "embedded system" usually refers to computer hardware and software that is part of a larger system. In the network 100 that is depicted in FIG. 1, some of the nodes 102 may be embedded systems.

The network 100 shown in FIG. 1 is provided for purposes of example only. For simplicity, the network 100 shown in FIG. 1 only includes a few nodes 102. However, embodiments may be practiced in peer-to-peer networks that include many more nodes 102. Embodiments may also be practiced in peer-to-peer networks that include fewer nodes 102.

Some or all of the nodes 102 within the network 100 may be configured to multicast messages to other nodes 102 in the network 100. As used herein, the term "multicasting" refers to the process of sending a message simultaneously to more than one node 102 on the network 100. Multicasting is different from broadcasting in that multicasting means sending a message to specific groups of nodes 102 within a network 100, whereas broadcasting implies sending a message to all of the nodes 102 on the network 100. The nodes 102 within the network 100 may also be configured to unicast messages to other network nodes 102. The term "unicasting" refers to sending a message to a specific node 102 in the network 100. A connectionless transport protocol, such as the User Datagram Protocol (UDP), may be used both for multicasting and for unicasting messages to other network nodes 102. Alternatively, embodiments of the invention may be practiced with a network 100 where broadcast is used in place of multicast. Broadcast is a special case of multicast, where the multicast group includes all nodes 102.

At least some of the nodes 102 may provide data and/or services to other nodes 102 on the network 100. Nodes 102 may also provide data and/or services to devices that are located outside of the network 100, e.g., via the Internet 108.

As used herein, the term "multicast request" refers to a request for data and/or one or more services that is sent via multicast. A multicast request is addressed to a multicast group, and (ideally) is delivered to all of the nodes 102 that have joined the multicast group. A "requestor" is a node 102 that sends a multicast request. A "responder" is a node 102 that responds to a multicast request.

FIGS. 2A-2F illustrate how nodes 202 within a peer-to-peer network 100 may interact in order to provide data and/or services to one another. The illustrated example involves four nodes 202, namely node A 202a, node B 202b, node C 202c, and node D 202d.

Figure 2A:
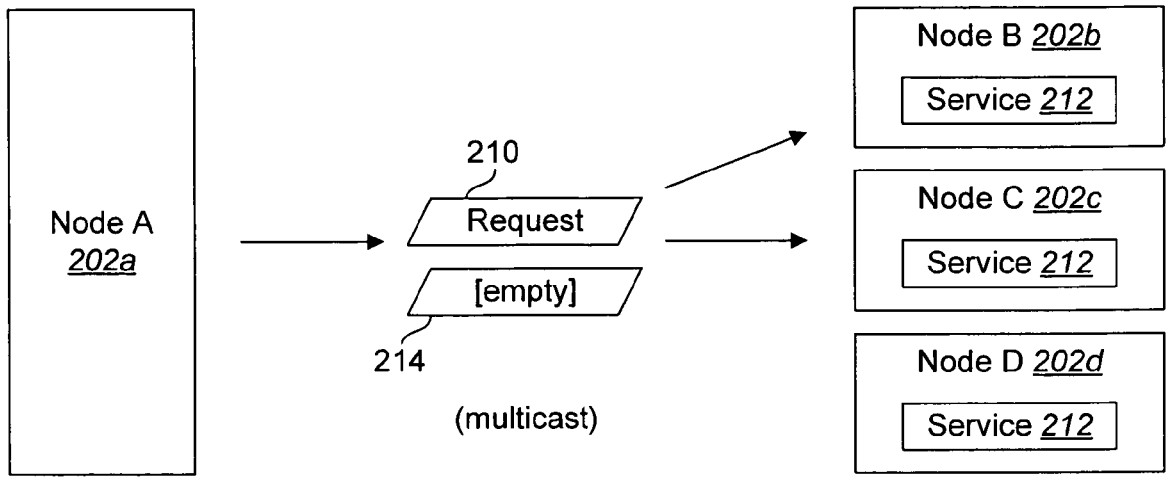
FIGS. 2A-2F illustrate an example showing how nodes within a peer-to-peer network may interact in order to provide data and/or services to one another.

As shown in FIG. 2A, node A 202a initially multicasts a request 210 for a service 212. In addition to the request 210, node A 202a also multicasts a responder list 214 that is associated with the request 210. For example, a transaction ID may be assigned to both the request 210 and the responder list 214. In general terms, a responder list 214 that is associated with a multicast request 210 is a list of nodes 202 that have previously responded to the multicast request 210. A responder list 214 may be used to enhance throughput of data within a network 100, as will be explained in greater detail below. In FIG. 2A, the responder list 214 is empty. This is because FIG. 2A is showing the requestor 202a sending the multicast request 210 for the first time. Of course the request 210 and responder list 214 may be sent together over the network 100.

In the illustrated example, it will be assumed that node B 202b, node C 202c, and node D 202d have joined the multicast group to which the request 210 is addressed. Node B 202b and node C 202c both receive the multicast request 210 when it is sent for the first time. However, node D 202d does not receive the multicast request 210 when it is sent for the first time. There are a variety of reasons why the multicast request 210 may not be received by node D 202d. For example, the network 100 may be overly congested with traffic, and the request 210 may be dropped at some point en route from node A 202a to node D 202d. When a packet, such as a multicast request 210, is dropped before it reaches its destination, this is sometimes referred to as packet loss. (The term "packet" refers to a unit of information that is transmitted from one node 202 to another node 202 on the network 100. Typically, a multicast request 210 is contained within a single packet.)

Figure 2B:
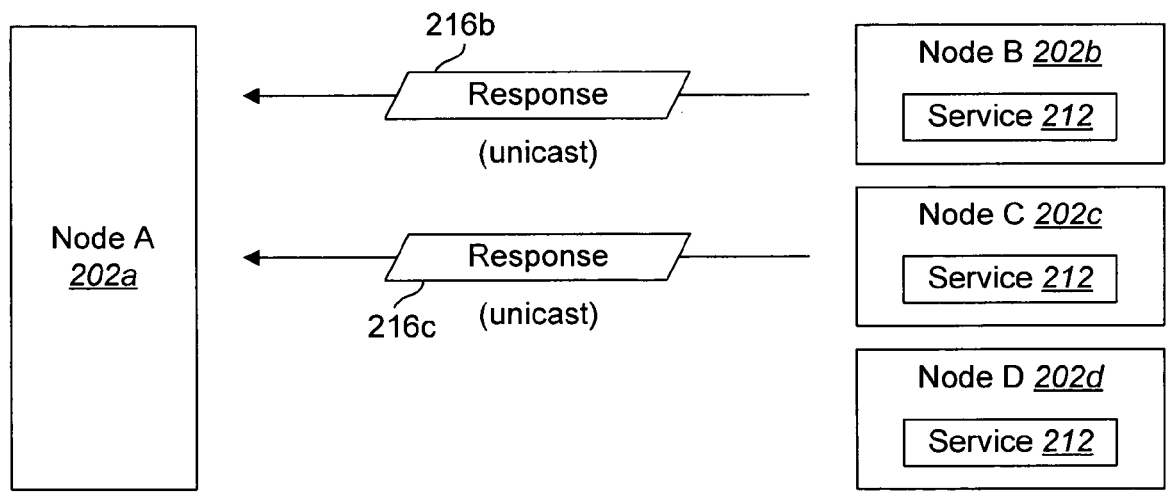

When a node 202 receives a multicast request 210, it determines whether it is capable of providing the requested data and/or service(s). If it is, the node 202 sends a response 216 to the node 202 that sent the multicast request 210. FIG. 2B shows the operation of node B 202b, node C 202c, and node D 202d in response to node A 202a sending the request 210 for the first time. Node B 202b and node C 202c both provide the requested service 212. Accordingly, node B 202b sends a response 216b back to node A 202a. Also, node C 202c sends a response 216c back to node A 202a. The responses 216b, 216c may be sent via unicast. Because node D 202d did not receive the request 210, it does not respond to the multicast request 210.

Figure 2C:
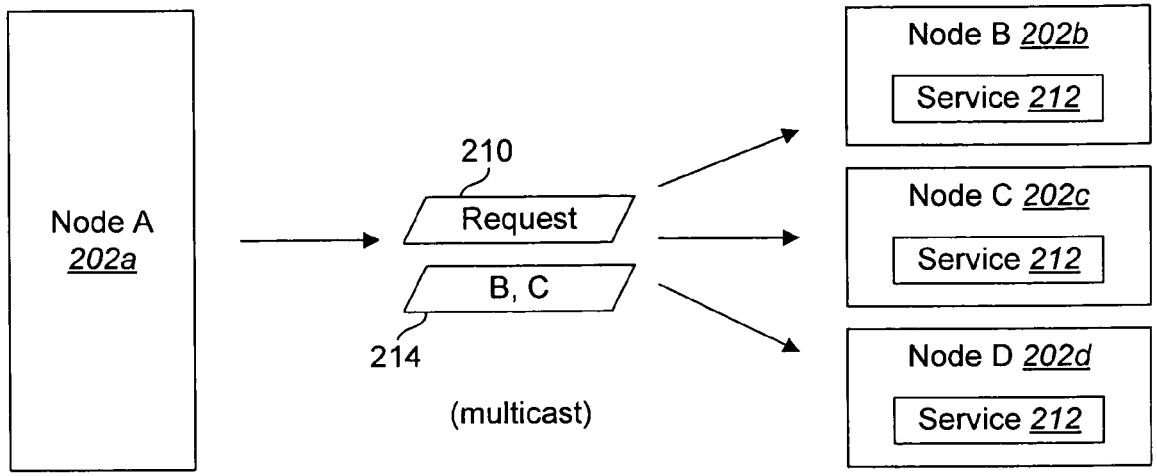
Figure 2D:
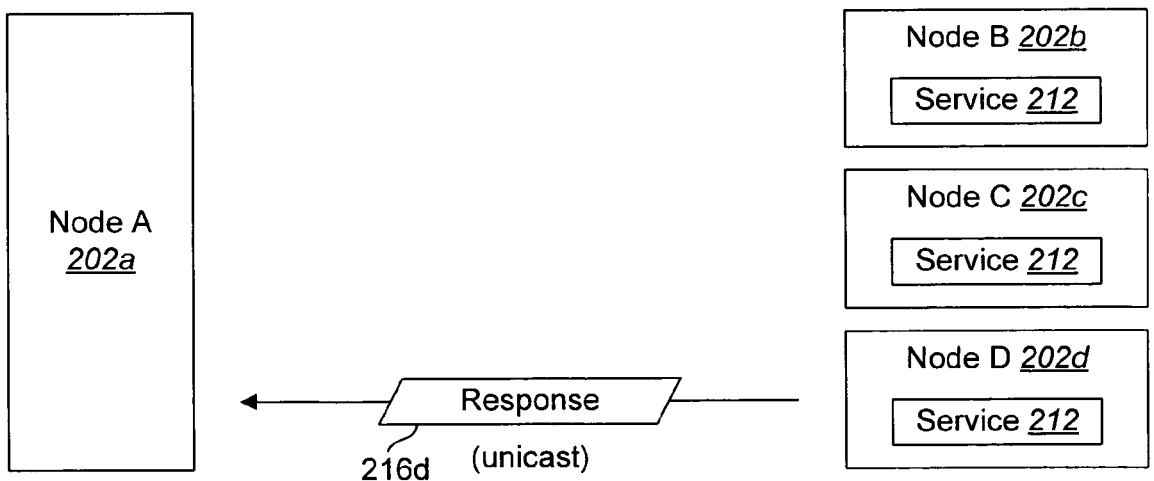

After a certain period of time, node A 202a resends the request 210 for the desired service 212. FIG. 2C shows node A 202a sending the request 210 and the responder list 214 for the second time. FIG. 2D shows the operation of node B 202b, node C 202c, and node D 202d in response to node A 202a sending the request 210 and the responder list 214 for the second time.

As before, both the request 210 and the responder list 214 are sent via multicast. Because node B 202b and node C 202c have previously responded to the multicast request 210, the responder list 214 now includes both node B 202b and node C 202c. As shown in FIG. 2C, node B 202b, node C 202c, and node D 202d each receive the multicast request 210 and the responder list 214 when they are sent for the second time. When node B 202b and node C 202c receive the multicast request 210 and the responder list 214, they both recognize that they are included in the responder list 214. As a result, neither node B 202b nor node C 202c responds to this multicast request 210. However, node D 202d recognizes that it is not included in the responder list 214. Accordingly, as shown in FIG. 2D, node D 202d sends a response 216d back to node A 202a. The response 216d may be sent via unicast.

Figure 2E:
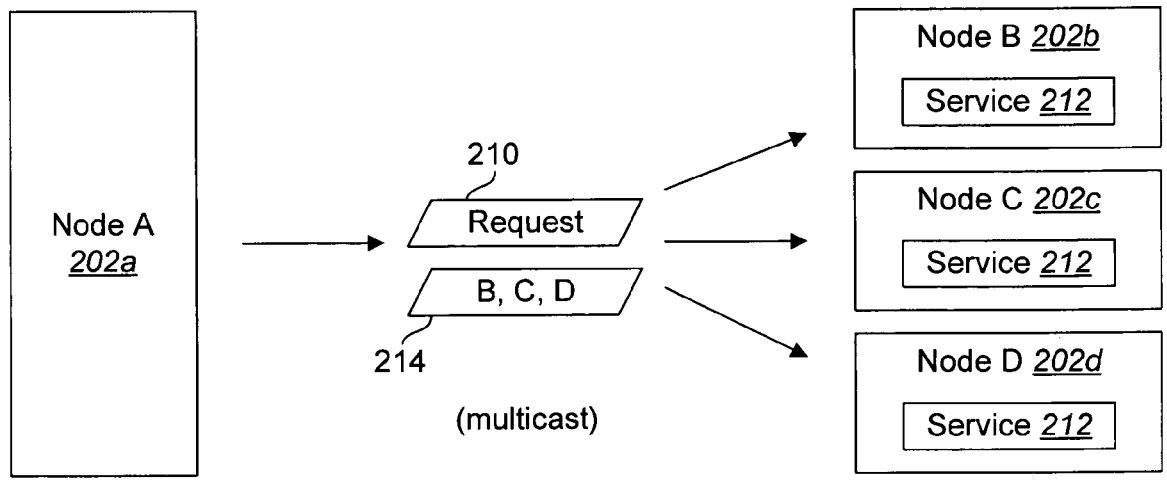
Figure 2F:
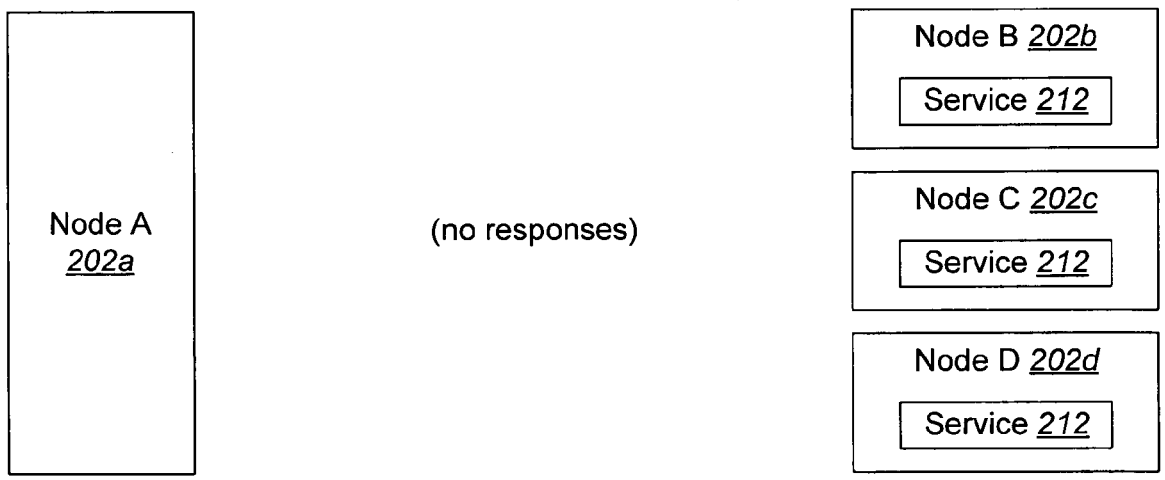

After a certain period of time, node A 202a once again resends the request 210 for the desired service 212. FIG. 2E shows node A 202a sending the request 210 and the responder list 214 for the third time. FIG. 2F shows the operation of node B 202b, node C 202c, and node D 202d in response to node A 202a sending the request 210 and the responder list 214 for the third time.

As before, both the request 210 and the responder list 214 are sent via multicast. Because node B 202b, node C 202c, and node D 202d have previously responded to the multicast request 210, the responder list 214 now includes node B 202b, node C 202c, and node D 202d. As shown in FIG. 2E, node B 202b, node C 202c, and node D 202d each receive the multicast request 210 and the responder list 214 when they are sent for the third time. Each of these nodes 202b, 202c, 202d recognizes that it is included in the responder list 214. As a result, none of these nodes 202b, 202c, 202d responds to this multicast request 210.

The number of times that a requester (e.g., node A 202a) resends a multicast request 210 after the initial attempt will be referred to herein as the number of "retries." A requestor may be configured so that it sends a certain number of retries. In the example shown in FIGS. 2A-2F, there was one initial attempt and two retries. Of course, a requester may be configured to send additional retries or fewer retries in accordance with embodiments disclosed herein.

Figure 3:
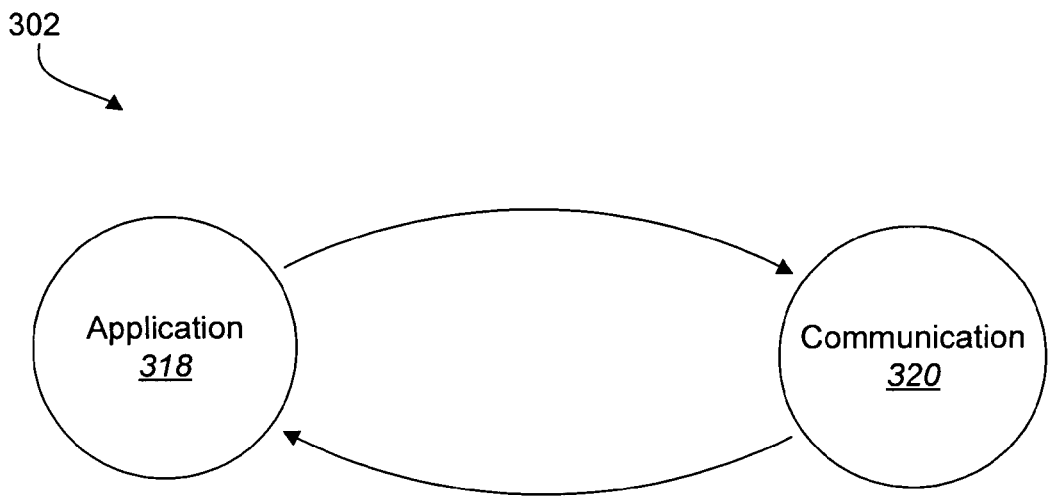
FIG. 3 is a data flow diagram that illustrates various software components that may be utilized by a node in a peer-to-peer network according to an embodiment.

FIG. 3 is a data flow diagram that illustrates various software components that may be utilized by a node 302 in a peer-to-peer network 100 according to an embodiment. The node 302 shown in FIG. 3 includes an application module 318. The application module 318 may provide data and/or services to other nodes 102 on the network 100. The application module 318 may also obtain data and/or services from other nodes 102 on the network 100.

The illustrated node 302 also includes a communication module 320. The communication module 320 facilitates communication between the application module 318 and other nodes 102 in the network 100. The communication module 320 may be configured to send messages to and receive messages from other network nodes 102 via multicast and/or via unicast.

The application module 318 and the communication module 320 may work together in order for the node 302 to interact with other nodes 102 in the network 100 in the manner illustrated above in connection with FIGS. 2A-2F. In order to obtain data and/or one or more services provided by one or more other nodes 102 on the network 100, the application module 318 may make one or more calls to the communication module 320 to multicast a request 210 for the data and/or service(s). When other node(s) 102 on the network 100 respond to the multicast request 210, the response(s) 216 may be received by the communication module 320 and then directed to the application module 318.

Figure 4:
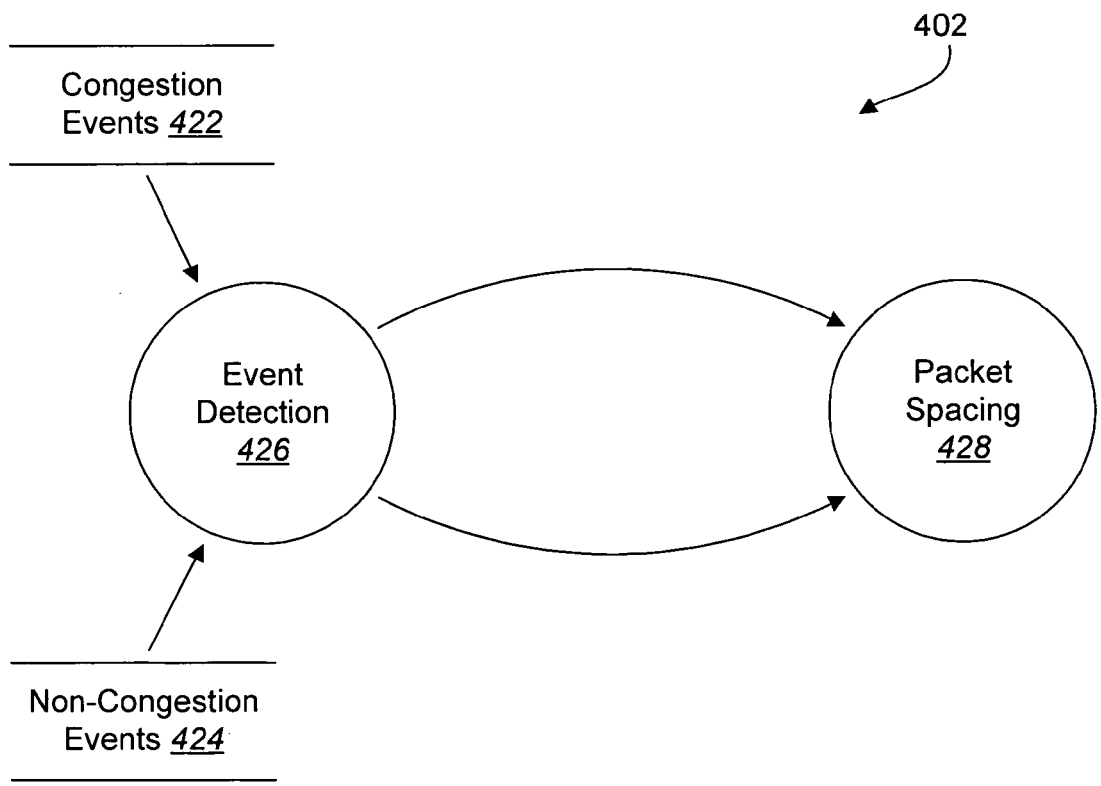
FIG. 4 is another data flow diagram that illustrates various software components that may be utilized by a node in a peer-to-peer network according to an embodiment.

FIG. 4 is another data flow diagram that illustrates various software components that may be utilized by a node 402 in a peer-to-peer network 100 according to an embodiment. As indicated above, embodiments disclosed herein relate to mechanisms for managing traffic within a peer-to-peer network 100 in order to maximize throughput while minimizing packet loss. The components shown in FIG. 4 may be used to implement this functionality.

In the depicted embodiment, a number of events 422 are defined as implying congestion on the network 100. These events 422 will be referred to herein as congestion events 422. In addition, a number of events 424 are defined as implying a lack of congestion on the network 100. These events 424 will be referred to herein as non-congestion events 424. Non-congestion events 424 may help to forecast/predict future network congestion. Some examples of congestion events 422 and non-congestion events 424 will be discussed below.

An event detection module 426 is provided on the node 402. The event detection module 426 monitors the activity of the node 402 for the occurrence of one of the congestion events 422 or one of the non-congestion events 424.

A packet spacing module 428 is also provided on the node 402. When the event detection module 426 detects any of the defined congestion events 422 or non-congestion events 424, it notifies the packet spacing module 428. If one (or more) of the defined congestion events 422 is detected, the packet spacing module 428 increases the spacing of packets that are sent by the node 402. In other words, the node 402 increases the amount of time that it waits after sending one packet before it sends another packet. This is done for the purpose of decreasing the amount of traffic on the network 100, thereby decreasing network 100 congestion. Conversely, if one (or more) of the defined non-congestion events 424 is detected, this means that there is not a significant amount of traffic on the network 100, and in response the packet spacing module 428 decreases the spacing of packets that are sent by the node 402 (i.e., it decreases the amount of time that it waits after sending one packet before it sends another packet).

In some embodiments, the packet spacing module 428 only adjusts the spacing of packets that are sent according to a connectionless protocol, such as UDP. The packet spacing module 428 may be configured so that it does not affect the spacing of packets that are sent in accordance with a connection-based protocol, such as TCP/IP.

Figure 5:
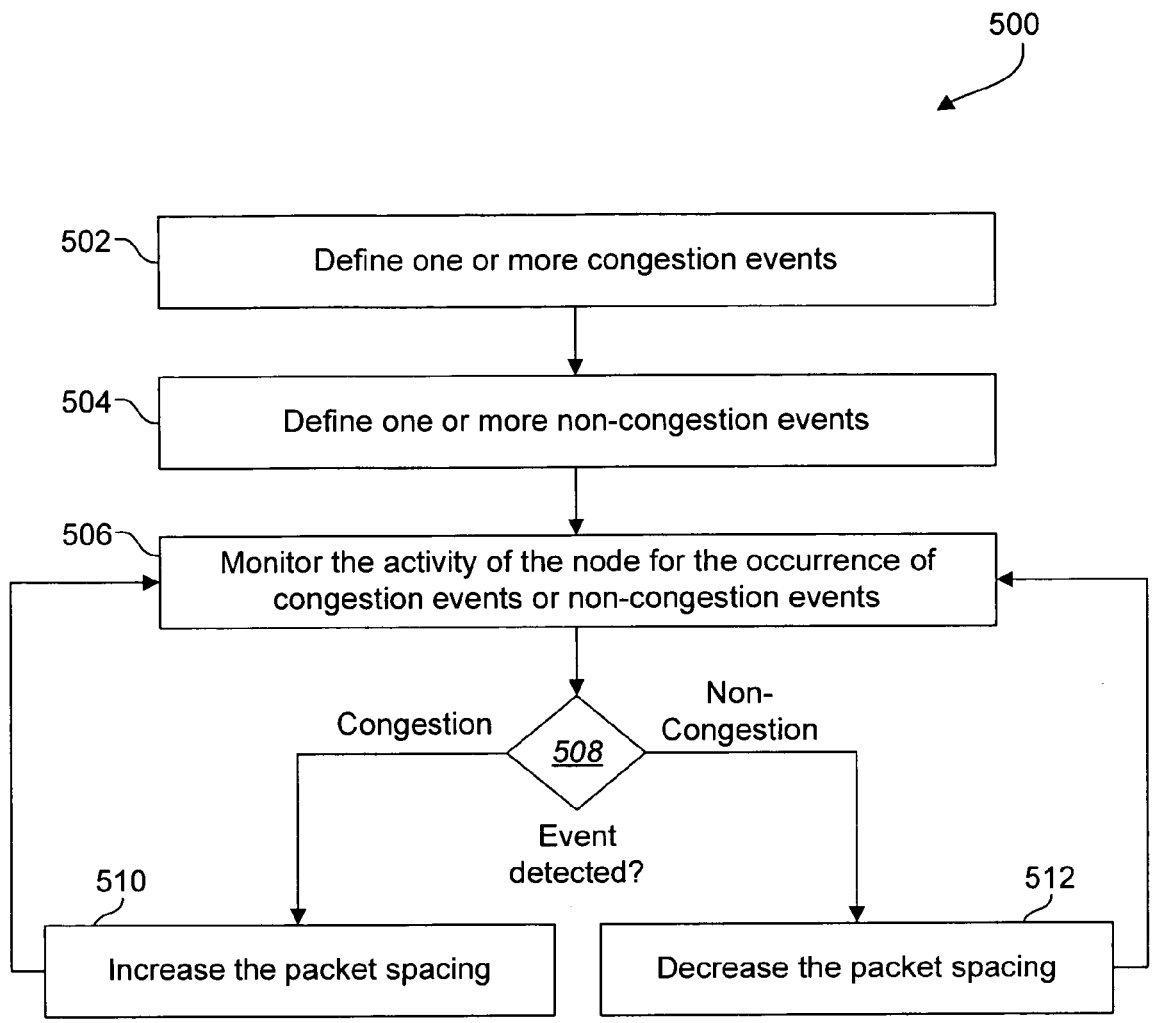
FIG. 5 is a flow diagram that illustrates the operation of a node within a peer-to-peer network according to an embodiment.

FIG. 5 is a flow diagram that illustrates the operation of a node 102 within a peer-to-peer network 100 according to an embodiment. In accordance with the illustrated method 500, one or more congestion events 422 are defined 502. Also, one or more non-congestion events 424 are defined 504.

An event detection module 426 on the node 102 may monitor 506 the activity of the node 102 for the occurrence of one of the congestion events 422 or one of the non-congestion events 424. When a congestion event 422 is detected 508, a packet spacing module 428 on the node 102 may increase 510 the spacing of packets that are sent by the node 402 in an attempt to decrease network congestion. Conversely, when a non-congestion event 424 is detected, the packet spacing module 428 may decrease 512 the spacing of packets that are sent by the node 102.

In some embodiments, multiple nodes 102 on the network 100 operate in accordance with the method 500 shown in FIG. 5. In other words, multiple nodes 102 may be configured to increase packet spacing when congestion events 422 are detected, and to decrease packet spacing when non-congestion events 424 are detected. In fact, all of the nodes 102 on the network 100 may be configured to operate in this manner. In this way, a mechanism may be provided for maximizing throughput of data within the network 100 while minimizing packet loss. Advantageously, it is not necessary for a central server to control packet spacing of the individual nodes 102 within the network 100. Instead, the nodes 102 themselves adjust packet spacing in response to network conditions.

An example of a specific algorithm that may be used by a node 102 in a peer-to-peer network 100 according to an embodiment will now be discussed. Although a specific algorithm will be discussed, embodiments are not limited to this specific algorithm. Indeed, any adaptive algorithm may be used with embodiments disclosed herein. Some examples of adaptive algorithms that may be used include neural net algorithms, fuzzy logic algorithms, genetic algorithms, etc.

Figure 6:
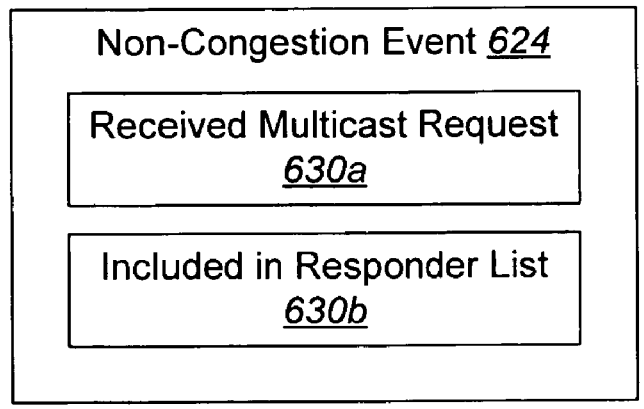
FIG. 6 illustrates an example of a non-congestion event that may be defined for a node according to an embodiment.

FIG. 6 illustrates an example of a non-congestion event 624 that may be defined for a node 102 according to an embodiment. The non-congestion event 624 shown in FIG. 6 includes two conditions 630a, 630b. The first condition 630a is that the node 102 has received a multicast request 210 and a responder list 214 that is associated with the multicast request 210. The second condition 630b is that the node 102 is included in the responder list 214. If the event detection module 426 determines that both of these conditions 630a, 630b are satisfied, then event detection module 426 determines that the non-congestion event 624 has occurred.

As indicated above, in response to detecting a non-congestion event 624, a node 102 may decrease its packet spacing. In some embodiments, when the non-congestion event 624 that is shown in FIG. 6 occurs, the node 102 may decrease its packet spacing in accordance with equation 1:

$$\text{swnd}_{new} = \text{swnd} * (1 - 1/\text{shrink}_{factor}) \tag{1}$$

In equation 1, the term swnd is the current value of a send window. The send window is a variable that may be defined for a node 102. The send window indicates how long the node 102 waits between sending packets. The term $\text{swnd}_{new}$ is the new value of the send window. The term $\text{shrink}_{factor}$ is a multiplier that may be used to control how quickly the send window is decreased under favorable network 100 conditions. In an exemplary embodiment, the value of $\text{shrink}_{factor}$ may be set equal to 16.

Figure 7:
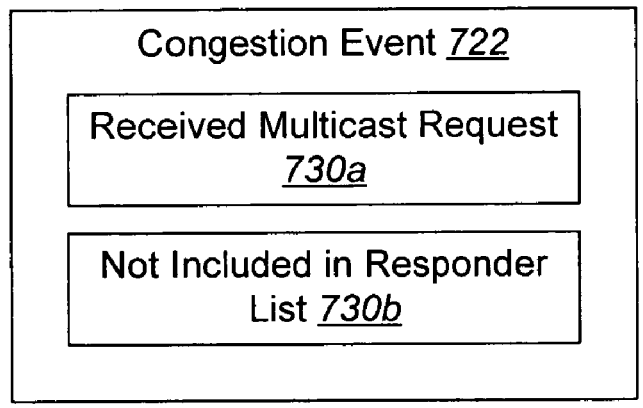
FIG. 7 illustrates an example of a congestion event that may be defined for a node according to an embodiment.

FIG. 7 illustrates an example of a congestion event 722 that may be defined for a node 102 according to an embodiment. The congestion event 722 shown in FIG. 7 includes two conditions 730a, 730b. The first condition 730a is that the node 102 has received a multicast request 210 and a responder list 214 that is associated with the multicast request 210. The second condition 730b is that the node 102 is not included in the responder list 214 even though it provides the service 212. If the event detection module 426 determines that both of these conditions 730a, 730b are satisfied, then the event detection module 426 determines that the congestion event 722 has occurred.

As indicated above, in response to detecting a congestion event 722, a node 102 may increase its packet spacing. In some embodiments, when the congestion event 722 that is shown in FIG. 7 occurs, the node 102 may increase its packet spacing in accordance with equation 2:

$$\text{swnd}_{new} = \text{grow}_{min + swndmax/rlSize/growthrottle} \tag{2}$$

In equation 2, the term $\text{swnd}_{new}$ is the new value of the send window (the send window was discussed above in connection with equation 1). The term $\text{grow}_{min}$ is the minimum value of the send window when the node 102 is increasing the packet spacing. The term $\text{swnd}_{max}$ is the maximum value of the send window. The term rlSize is the size of the responder list 214. The term $\text{grow}_{throttle}$ is a multiplier that may be used to control how quickly the packet spacing is increased. In an exemplary embodiment, $\text{grow}_{min}$ may be set equal to 0.5 seconds, $\text{swnd}_{max}$ may be set equal to 8 seconds, and $\text{grow}_{throttle}$ may be set equal to 1.

Figure 8:
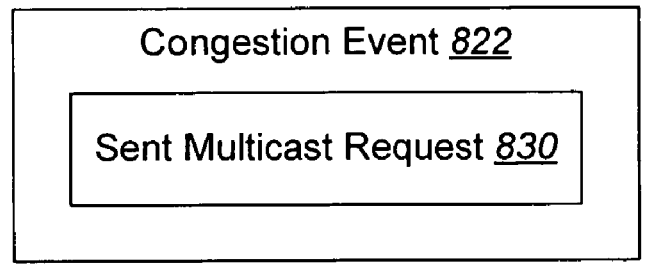
FIG. 8 illustrates another example of a congestion event that may be defined for a node according to an embodiment.

FIG. 8 illustrates another example of a congestion event 822 that may be defined for a node 102 according to an embodiment. The congestion event 822 shown in FIG. 8 includes a single condition 830. This condition 830 is that the node 102 sends a multicast request 210. In some embodiments, when the congestion event 822 shown in FIG. 8 occurs, the node 102 may increase the packet spacing in accordance with equation 3:

$$\text{swnd}_{new} = \text{swnd} * (1 + 1/\text{shrink}_{factor}) \tag{3}$$

In equation 3, the term swnd is the send window (discussed above). The term $\text{swnd}_{new}$ is the new value of the send window. The term $\text{shrink}_{factor}$ is a multiplier that may be used to control how quickly the send window is decreased under favorable network 100 conditions.

Figure 9:
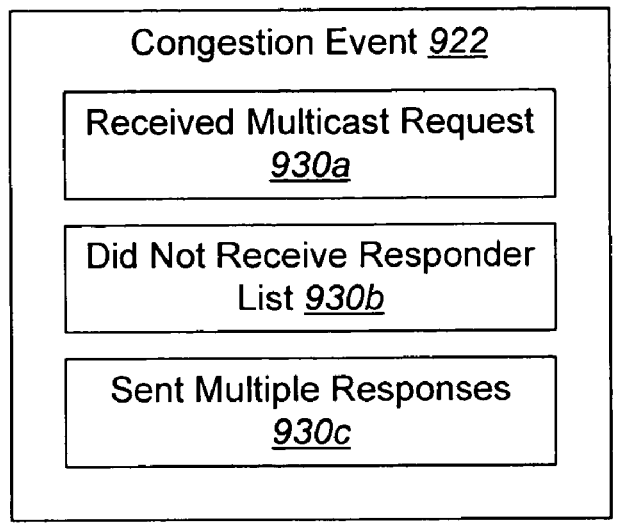
FIG. 9 illustrates another example of a congestion event that may be defined for a node according to an embodiment.

FIG. 9 illustrates another example of a congestion event 922 that may be defined for a node 102 according to an embodiment. The congestion event 922 shown in FIG. 9 includes three conditions 930a, 930b, 930c. The first condition 930a is that the node 102 has received a multicast request 210. The second condition 930b is that the node 102 did not receive the associated responder list 214. The third condition 930c is that the node 102 sends multiple responses 216 to the multicast request 210 (as a result of not receiving the responder list 214). If the event detection module 426 determines that all of these conditions 930a, 930b, 930c are satisfied, then the event detection module 426 determines that the congestion event 922 has occurred. In some embodiments, when the congestion event 922 shown in FIG. 9 occurs, the node 102 may increase the packet spacing in accordance with equation 4:

$$\text{swnd} = \text{swnd} + (\text{swnd}_{max-swnd})/\text{growfactor} \tag{4}$$

In equation 4, the term swnd is the send window. The term $\text{swnd}_{max}$ is the maximum value of the send window. The term grow factor is a multiplier that may be used to control the growth rate of the send window under unfavorable conditions. In an exemplary embodiment, the term $\text{swnd}_{max}$ may be set equal to 8 seconds, and the term $\text{grow}_{factor}$ may be set equal to 16.

Figure 10:
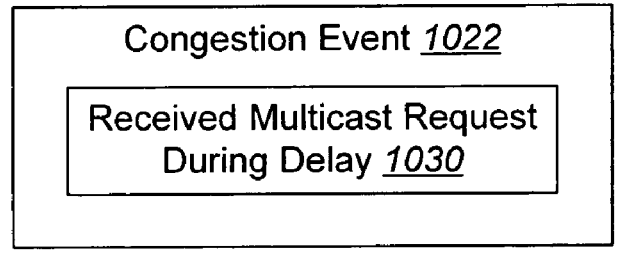
FIG. 10 illustrates another example of a congestion event that may be defined for a node according to an embodiment.

FIG. 10 illustrates another example of a congestion event 1022 that may be defined for a node 102 according to an embodiment. The congestion event 1022 shown in FIG. 10 includes a single condition 1030. This condition 1030 is that the node 102 receives a multicast request 210 during a request-to-send delay. As discussed above, a node 102 may wait for a certain amount of time after sending one packet before it sends another packet. This may be done for the purpose of decreasing the amount of traffic on the network 100, thereby decreasing network 100 congestion. The term "request-to-send delay" refers to the period of time after the node 102 determines it needs to send a packet but before the packet is actually sent due to the delay introduced by the send window. In some embodiments, when the congestion event 1022 shown in FIG. 10 occurs, the node 102 may increase the packet spacing in accordance with equation 5:

$$\text{timeSendMcast} = (\text{swnd} + \text{swnd}_{jitter})/(1 + \text{mretries}) \tag{5}$$

In equation 5, the term timeSendMcast is the length of time the node 102 waits until it sends a multicast packet. This delay is intended to cause all nodes 102 to space out their requests to prevent spikes from causing packet loss. The term swnd is the send window (discussed above). The term $\text{swnd}_{jitter}$ is a random number (e.g., between 0 and 100) that introduces variability in the sending of packets to avoid collisions. The term mretries is the number of times the node 102 received a multicast request while it was waiting to send one itself. The number is used in the equation to prevent starvation, meaning the inability to send any packets.

Figure 11:
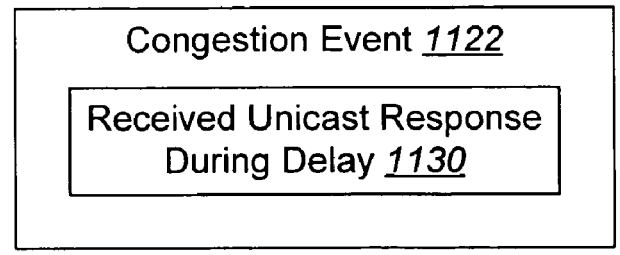
FIG. 11 illustrates another example of a congestion event that may be defined for a node according to an embodiment.

FIG. 11 illustrates another example of a congestion event 1122 that may be defined for a node 102 according to an embodiment. The congestion event 1122 shown in FIG. 11 includes a single condition 1130. This condition 1130 is that the node 102 receives a unicast response 216 during a request-to-send delay, as discussed above. In some embodiments, when the congestion event 1122 shown in FIG. 11 occurs, the node 102 may increase the packet spacing in accordance with equation 6:

$$\text{timeSendUcast} = \text{rand}(\text{swnd}/2) \quad (6)$$

In equation 6, the term timeSendUcast is the length of time the node 102 waits until it sends a unicast packet. This delay is intended to cause all responders to space out their requests to prevent spikes from causing packet loss. The term swnd is the send window (discussed above). The term rand(swnd/2) is a random number between 0 and swnd/2.

Figure 12:
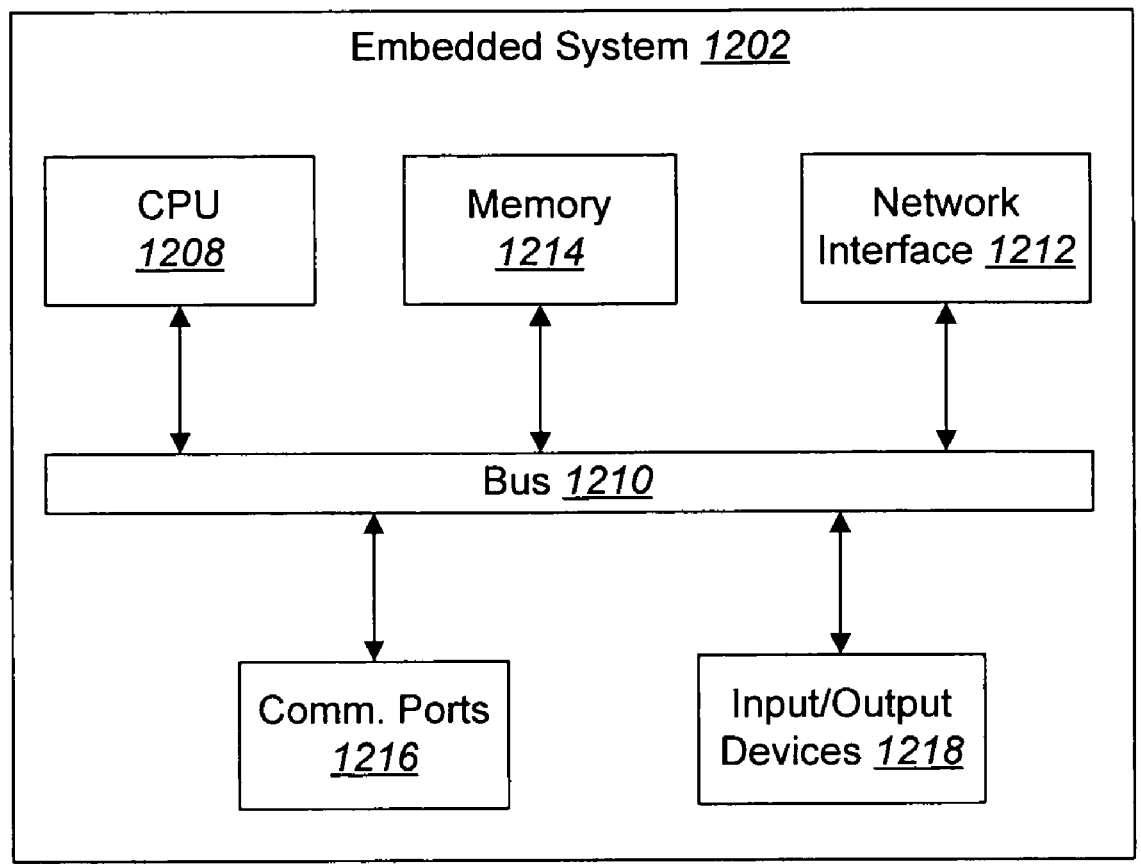
FIG. 12 is a block diagram of hardware components that may be used in an embedded system that is configured according to an embodiment.

As indicated above, a node 102 within a peer-to-peer network 100 may be an embedded system. FIG. 12 is a block diagram of hardware components that may be used in an embedded system 1202 that is configured according to an embodiment. A central processing unit (CPU) 1208 or processor may be provided to control the operation of the embedded system 1202, including the other components thereof, which are coupled to the CPU 1208 via a bus 1210. The CPU 1208 may be embodied as a microprocessor, microcontroller, digital signal processor or other device known in the art. The CPU 1208 performs logical and arithmetic operations based on program code stored within the memory. In certain embodiments, the memory 1214 may be on-board memory included with the CPU 1208. For example, microcontrollers often include a certain amount of on-board memory.

The embedded system 1202 may also include a network interface 1212. The network interface 1212 allows the embedded system 1202 to be connected to a network, which may be a pager network, a cellular network, a global communications network, the Internet, a computer network, a telephone network, etc. The network interface 1212 operates according to standard protocols for the applicable network.

The embedded system 1202 may also include memory 1214. The memory 1214 may include random access memory (RAM) for storing temporary data. Alternatively, or in addition, the memory 1214 may include read-only memory (ROM) for storing more permanent data, such as fixed code and configuration data. The memory 1214 may also be embodied as a magnetic storage device, such as a hard disk drive. The memory 1214 may be any type of electronic device that is capable of storing electronic information.

The embedded system 1202 may also include one or more communication ports 1216, which facilitate communication with other devices. The embedded system 1202 may also include input/output devices 1218, such as a keyboard, a mouse, a joystick, a touchscreen, a monitor, speakers, a printer, etc.

Of course, FIG. 12 illustrates only one possible configuration of an embedded system 1202. Various other architectures and components may be utilized.

Figure 13:
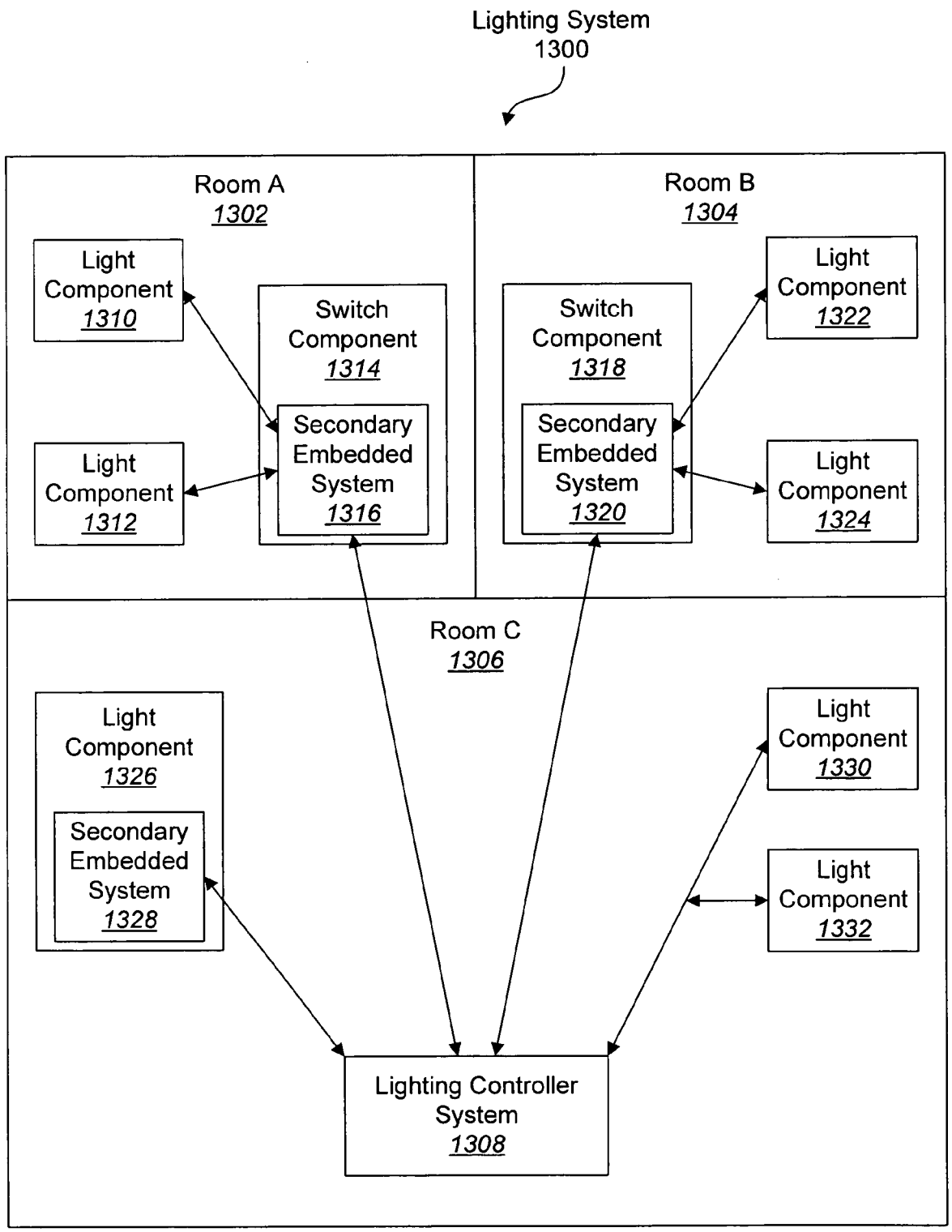
FIG. 13 illustrates an exemplary lighting system in which the present systems and methods may be implemented.

The present systems and methods may be used in several contexts. FIG. 13 illustrates one embodiment of a system wherein the present systems and methods may be implemented. FIG. 13 is a block diagram that illustrates one embodiment of a lighting system 1300 that includes a lighting controller system 1308. The lighting system 1300 of FIG. 13 may be incorporated in various rooms in a home. As illustrated, the system 1300 includes a room A 1302, a room B 1304, and a room C 1306. Although three rooms are shown in FIG. 13, the system 1300 may be implemented in any number and variety of rooms within a home, dwelling, or other environment.

The lighting controller system 1308 may monitor and control additional embedded systems and components within the system 1300. In one embodiment, the room A 1302 and the room B 1304 each include a switch component 1314, 1318. The switch components 1314, 1318 may also include a secondary embedded system 1316, 1320. The secondary embedded systems 1316, 1320 may receive instructions from the lighting controller system 1308. The secondary embedded systems 1316, 1320 may then execute these instructions. The instructions may include powering on or powering off various light components 1310, 1312, 1322, and 1324. The instructions may also include dimming the brightness or increasing the brightness of the various light components 1310, 1312, 1322, and 1324. The instructions may further include arranging the brightness of the light components 1310, 1312, 1322, and 1324 in various patterns. The secondary embedded systems 1316, 1320 facilitate the lighting controller system 1308 to monitor and control each light component 1310, 1312, 1322, and 1324 located in the room A 1302 and the room B 1304.

The lighting controller system 1308 might also provide instructions directly to a light component 1326 that includes a secondary embedded system 1328 in the depicted room C 1306. The lighting controller system 1308 may instruct the secondary embedded system 1328 to power down or power up the individual light component 1326. Similarly, the instructions received from the lighting controller system 1308 may include dimming the brightness or increasing the brightness of the individual light component 1326.

The lighting controller system 1308 may also monitor and provide instructions directly to individual light components 1330 and 1332 within the system 1300. These instructions may include similar instructions as described previously.

Figure 14:
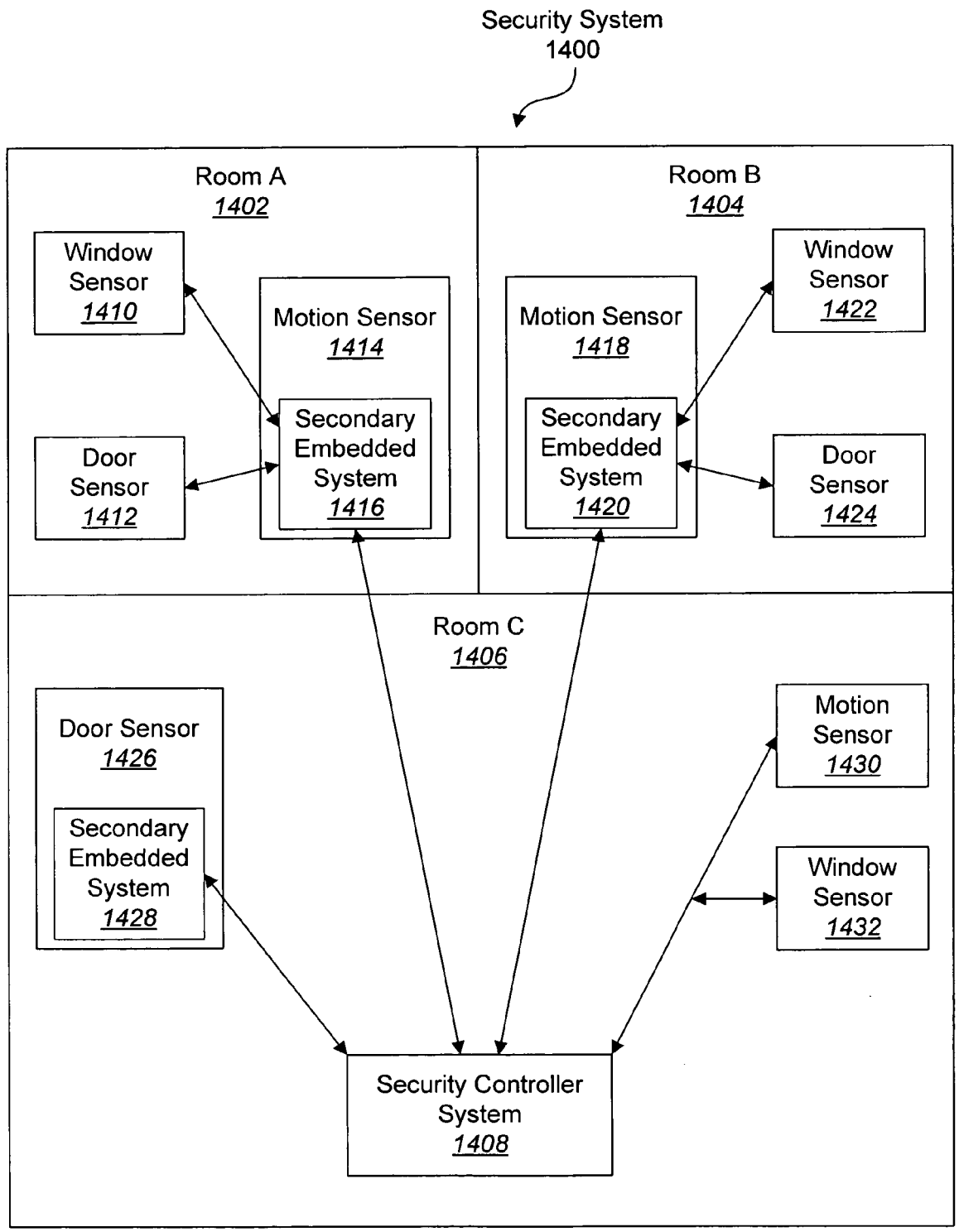
FIG. 14 illustrates an exemplary security system in which the present systems and methods may be implemented.

FIG. 14 is an additional embodiment of a system wherein the present systems and methods of the present invention may be implemented. FIG. 14 is a block diagram illustrating a security system 1400. The security system 1400 in the depicted embodiment is implemented in a room A 1402, a room B 1404, and a room C 1406. These rooms may be in the confines of a home or other enclosed environment. The system 1400 may also be implemented in an open environment where the rooms A, B and C, 1402, 1404, and 1406 respectively represent territories or boundaries.

The system 1400 includes a security controller system 1408. The security controller system 1408 monitors and receives information from the various components within the system 1400. For example, a motion sensor 1414, 1418 may include a secondary embedded system 1416. The motion sensors 1414, 1418 may monitor an immediate space for motion and alert the security controller system 1408 when motion is detected via the secondary embedded system 1416, 1420. The security controller system 1408 may also provide instructions to the various components within the system 1400. For example, the security controller system 1408 may provide instructions to the secondary embedded systems 1416, 1420 to power up or power down a window sensor 1410, 1422 and a door sensor 1412, 1424. In one embodiment, the secondary embedded systems 1416, 1420 notify the security controller system 1408 when the window sensors 1410, 1422 detect movement of a window. Similarly, the secondary embedded systems 1416, 1420 notify the security controller system 1408 when the door sensors 1412, 1424 detect movement of a door. The secondary embedded systems 1416, 1420 may instruct the motion sensors 1414, 1418 to activate the LED (not shown) located within the motion sensors 1414, 1418.

The security controller system 1408 may also monitor and provide instructions directly to individual components within the system 1400. For example, the security controller system 1408 may monitor and provide instructions to power up or power down to a motion sensor 1430 or a window sensor 1432. The security controller system 1408 may also instruct the motion sensor 1430 and the window sensor 1432 to activate the LED (not shown) or audio alert notifications within the sensors 1430 and 1432.

Each individual component comprising the system 1400 may also include a secondary embedded system. For example, FIG. 14 illustrates a door sensor 1426 including a secondary embedded system 1428. The security controller system 1408 may monitor and provide instructions to the secondary embedded system 1428 in a similar manner as previously described.

Figure 15:
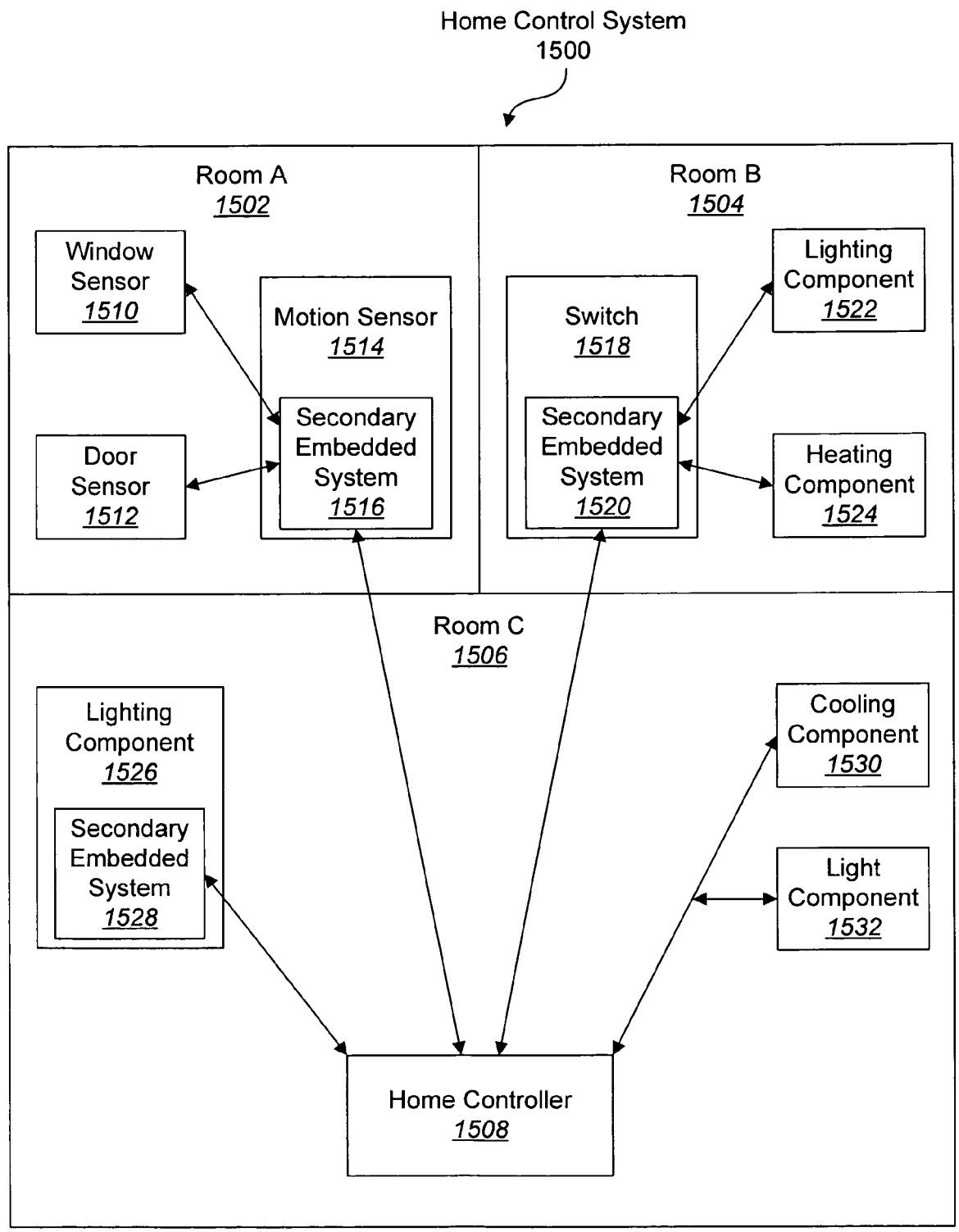
FIG. 15 illustrates an exemplary home controller system in which the present systems and methods may be implemented.

FIG. 15 is a block diagram illustrating one embodiment of a home control system 1500. The home control system 1500 includes a home controller 1508 that facilitates the monitoring of various systems such as the lighting system 1300, the security system 1400, and the like. The home control system 1500 allows a user to control various components and systems through one or more embedded systems. In one embodiment, the home controller system 1508 monitors and provides information in the same manner as previously described in relation to FIGS. 13 and 14. In the depicted embodiment, the home controller 1508 provides instructions to a heating component 1524 via a secondary embedded system 1520. The heating component 1524 may include a furnace or other heating device typically found in resident locations or offices. The home control system 1508 may provide instructions to power up or power down the heating component 1524 via the secondary embedded system 1520.

Similarly, the home controller 1508 may monitor and provide instructions directly to a component within the home control system 1500 such as a cooling component 1530. The cooling component 1530 may include an air conditioner or other cooling device typically found in resident locations or offices. The central home controller 1508 may instruct the cooling component 1530 to power up or power down depending on the temperature reading collected by the central embedded system 1508. The home control system 1500 functions in a similar manner as previously described in relation to FIGS. 13 and 14.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for managing traffic within a peer-to-peer network, the method being implemented by a node within the peer-to-peer network, the method comprising:

defining one or more congestion events that imply congestion on the peer-to-peer network, the one or more congestion events being defined to include either sending or receiving a multicast request;

defining one or more non-congestion events that imply a lack of congestion on the peer-to-peer network, the one or more non-congestion events being defined to include either sending or receiving a multicast request;

receiving a multicast request and a responder list that is associated with the multicast request, wherein the multicast request is a request for data or a request for a service;

determining whether the node provides the data or the service;

sending a response if the node provides the data or the service and if the node is not on the responder list and not sending a response if the node does not provide the data or the service or if the node is on the responder list;

increasing spacing of connectionless protocol packets that are sent by the node in response to detecting one or more of the defined congestion events; and decreasing the spacing of connectionless protocol packets that are sent by the node in response to detecting one or more of the defined non-congestion events.

2. The method of claim 1, further comprising monitoring activity of the node for the occurrence of any of the congestion events or the non-congestion events.

3. The method of claim 1, wherein the one or more non-congestion events comprise:
receiving a multicast request and a responder list that is associated with the multicast request; and
determining that the node is included in the responder list.

4. The method of claim 1, wherein the one or more congestion events comprise:
receiving a multicast request and a responder list that is associated with the multicast request; and
determining that the node is not included in the responder list.

5. The method of claim 1, wherein the one or more congestion events comprise:
receiving a multicast request that is not the first multicast request sent by the node but not receiving a responder list that is associated with the multicast request; and
sending multiple responses to the multicast request.

6. The method of claim 1, wherein the one or more congestion events comprise receiving a multicast request while waiting to send a packet.

7. The method of claim 1, wherein the one or more congestion events comprises, after a multicast request was sent, receiving a unicast response while waiting to send a packet.

8. The method of claim 1, wherein the connectionless protocol is the User Datagram Protocol.

9. The method of claim 1, wherein the node is an embedded system.

10. A node in a peer-to-peer network that is configured for managing traffic within the network, the node comprising:
a processor;
memory in electronic communication with the processor;
instructions stored in the memory, the instructions being executable to:
define one or more congestion events that imply congestion on the peer-to-peer network, the one or more congestion events being defined to include either sending or receiving a multicast request;
define one or more non-congestion events that imply a lack of congestion on the peer-to-peer network, the one or more non-congestion events being defined to include either sending or receiving a multicast request;
receive a multicast request and a responder list that is associated with the multicast request, wherein the multicast request is a request for data or a request for a service;
determine whether the node provides the data or the service;
send a response if the node provides the data or the service and if the node is not on the responder list and not send a response if the node does not provide the data or the service or if the node is on the responder list;
increase spacing of packets that are sent by the node according to a connectionless protocol in response to detecting one or more of the defined congestion events; and
decrease the spacing of packets that are sent by the node according to the connectionless protocol in response to detecting one or more of the defined non-congestion events.

11. The node of claim 10, wherein the instructions are further executable to monitor activity of the node for the occurrence of any of the congestion events or the non-congestion events.

12. The node of claim 10, wherein the one or more non-congestion events comprise:
receiving a multicast request and a responder list that is associated with the multicast request; and
determining that the node is included in the responder list.

13. The node of claim 10, wherein the one or more congestion events comprise:
receiving a multicast request and a responder list that is associated with the multicast request; and
determining that the node is not included in the responder list.

14. The node of claim 10, wherein the one or more congestion events is selected from the group consisting of:
receiving a multicast request but not receiving a responder list that is associated with the multicast request, and sending multiple responses to the multicast request;
receiving the multicast request while waiting to send a packet; and
after a multicast request was sent, receiving a unicast response while waiting to send a packet.

15. A computer-readable medium comprising executable instructions for managing traffic within the network, the instructions being executable to:
define one or more congestion events that imply congestion on the peer-to-peer network, the one or more congestion events being defined to include either sending or receiving a multicast request;
define one or more non-congestion events that imply a lack of congestion on the peer-to-peer network, the one or more non-congestion events being defined to include either sending or receiving a multicast request;
receiving a multicast request and a responder list that is associated with the multicast request, wherein the multicast request is a request for data or a request for a service;
determining whether the node provides the data or the service;
sending a response if the node provides the data or the service and if the node is not on the responder list and not sending a response if the node does not provide the data or the service or if the node is on the responder list;
increase spacing of packets that are sent by the node according to a connectionless protocol in response to detecting one or more of the defined congestion events; and
decrease the spacing of packets that are sent by the node according to the connectionless protocol in response to detecting one or more of the defined non-congestion events.

16. The computer-readable medium of claim 15, wherein the instructions are further executable to monitor activity of the node for the occurrence of any of the congestion events or the non-congestion events.

17. The computer-readable medium of claim 15, wherein the one or more non-congestion events comprise:
   receiving a multicast request and a responder list that is associated with the multicast request; and
   determining that the node is included in the responder list.

18. The computer-readable medium of claim 15, wherein the one or more congestion events comprise:
   receiving a multicast request and a responder list that is associated with the multicast request; and
   determining that the node is not included in the responder list.

19. The computer-readable medium of claim 15, wherein the one or more congestion events is selected from the group consisting of:
   receiving a multicast request but not receiving a responder list that is associated with the multicast request, and sending multiple responses to the multicast request;
   receiving the multicast request while waiting to send a packet; and
   after a multicast request was sent, receiving a unicast response while waiting to send a packet.

* * * * *

UNITED STATES PATENT AND TRADEMARK OFFICE
CERTIFICATE OF CORRECTION

PATENT NO. : 7,680,044 B2  Page 1 of 1
APPLICATION NO. : 11/324030
DATED : March 16, 2010
INVENTOR(S) : Devon S. Sumner et al.

It is certified that error appears in the above-identified patent and that said Letters Patent is hereby corrected as shown below:

In column 7, line 31 please delete "requester" and replace it with --requestor--.
In column 7, line 36 please delete "requester" and replace it with --requestor--.
In column 9, line 58 please replace equation (2) with
-- $swnd_{new} = grow_{min} + swnd_{max}/rlSize/grow_{throttle}$ --.
In column 10, line 13 please replace equation (3) with
-- $swnd_{new} = swnd * (1+1/shrink_{factor})$ --.
In column 10, line 35 please replace equation (4) with
-- $swnd = swnd + (swnd_{max} - swnd)/grow_{factor}$ --.

Signed and Sealed this

Thirteenth Day of July, 2010

David J. Kappos
*Director of the United States Patent and Trademark Office*